United States Patent
Marino et al.

(10) Patent No.: US 6,832,332 B2
(45) Date of Patent: Dec. 14, 2004

(54) AUTOMATIC DETECTION AND CORRECTION OF MARGINAL DATA IN POLLING LOOP SYSTEM

(75) Inventors: Francis C. Marino, Dix Hills, NY (US); Tony Tung Sing Li, Roslyn Heights, NY (US)

(73) Assignee: Honeywell International Inc., Morristown, NJ (US)

( * ) Notice: Subject to any disclaimer, the term of this patent is extended or adjusted under 35 U.S.C. 154(b) by 448 days.

(21) Appl. No.: 09/887,312

(22) Filed: Jun. 22, 2001

(65) Prior Publication Data

US 2002/0199133 A1 Dec. 26, 2002

(51) Int. Cl.[7] ................................................ G06F 11/00
(52) U.S. Cl. ........................ 714/15; 375/375; 375/355
(58) Field of Search ............................. 714/15, 16, 20, 714/25, 40, 41, 48, 798, 799, 822; 375/355, 357, 358, 360, 376

(56) References Cited

U.S. PATENT DOCUMENTS

| | | | | |
|---|---|---|---|---|
| 4,672,365 A | * | 6/1987 | Gehman et al. | 340/539.16 |
| 4,707,841 A | * | 11/1987 | Yen et al. | 375/230 |
| 4,803,703 A | * | 2/1989 | DeLuca et al. | 375/368 |
| 5,355,392 A | * | 10/1994 | Takeuchi et al. | 375/340 |
| 5,790,603 A | * | 8/1998 | Maeda et al. | 375/342 |

FOREIGN PATENT DOCUMENTS

| | | | | |
|---|---|---|---|---|
| GB | 2186468 A | * | 8/1987 | H04L/25/03 |

* cited by examiner

*Primary Examiner*—Dieu-Minh Le
(74) *Attorney, Agent, or Firm*—Anthony R.Barkume, P.C.

(57) ABSTRACT

Provided is a system and method for detecting marginal data transmissions from any of a number of security devices in a security system including a control unit in communication with the security devices over a serial data communications loop. First, the control unit receives a data transmission from a security device, wherein the data transmission includes a number of bit intervals in which a logic 1 level is assumed by the control unit unless a logic 0 level is detected by the control unit. The control unit samples the data transmission at a first predetermined time during the bit interval to obtain a first sample value, and then it samples the data transmission at a second predetermined time during the bit interval to obtain a second sample value (the second predetermined time being later than the first predetermined time). If the first sample value is a logic 1 and the second sample value is a logic 0, this indicates that the data transmission from the security device is marginally recoverable. If, however, the first sample value is a logic 0 and the second sample value is a logic 0, this indicates that the data transmission is acceptable. If the second sample value is a logic 1, then the control unit assumes the transmitted data bit to be a logic 1, and it makes no indication regarding the acceptability of the data transmission.

12 Claims, 2 Drawing Sheets

AUTOMATIC DETECTION AND CORRECTION OF MARGINAL DATA IN POLLING LOOP SYSTEM

FIELD OF THE INVENTION

This invention relates to a method and system for automatically detecting and correcting marginal data transmissions in a polling loop system used for security system communications.

BACKGROUND OF THE INVENTION

Security systems that comprise a number of devices interconnected to a control panel by a communications bus, are well known in the art. Security devices typically are used to monitor an area of space or a specific access point, and report to the control panel if there is a change in status. For example, devices exist that monitor opening of doors or windows, that determine if an intruder has entered the premises such as by passive infrared surveillance techniques, or that determine if a fire has started, etc. Since most of these types of devices only report changes in status when a triggering event occurs, and a triggering event such as a fire may never in fact occur, it is important to poll or query each device on some periodic basis in order to ensure that they are up and running. This polling process is referred to as supervision of the devices, and generally is carried out by the control panel querying each device individually to determine at least if it is capable of sending a response back to the panel. If any given device does not report back, then the system will provide a warning to the system operator or monitoring company that the device needs to be investigated.

In order for a polling loop system to operate properly within acceptable margins, it must be installed within specific guide lines as defined to an installer via the associated installation instructions. Guidelines such as wire gauge, wire length, the use of shielded or non-shielded cable or metal conduits, number of devices per loop, etc. must be followed by the installer. However, it is more often than not that the installer badly estimates the length of the various wire he has installed and the allowable number of allowable devices installed which is within the power drive capability of the system. Exceeding the allowable wire size and capacitive and/or current loading in a given installation can result in unreliable signal recovery and can create intermittent or permanent errors which the installer has difficulty correcting.

SUMMARY OF THE INVENTION

This invention provides the security control unit with the ability to ascertain the overall transmission and reception margins of the system after the installation either by a special command from the installer or automatically by the security panel effected periodically while the system is in actual use. The polling loop system is used here as an example of an addressable polling loop system.

The invention is based on multiple time sampling of the received signals wherein at least one time sample occurs within the acceptable range of the received signal and at least one time sample which is outside the acceptable range of the received signal. If one or more devices are determined by the security control to be outside acceptable limits, the security control can adjust the baud rate of all, or specific, devices on the loop to bring those devices within marginal limits and/or to notify the installer via suitable keypad ennunciations.

Thus, the present invention is a system and method for detecting marginal data transmissions from any of a number of security devices in a security system including a control unit in communications with the security devices over a serial data communications loop. First, the control unit receives a data transmission from a security device, wherein the data transmission includes a number of bit intervals in which a logic 1 level is assumed by the control unit unless a logic 0 level is detected by the control unit. The control unit samples the data transmission at a first predetermined time during the bit interval to obtain a first sample value, and then it samples the data transmission at a second predetermined time during the bit interval to obtain a second sample value (the second predetermined time being later than the first predetermined time). If the first sample value is a logic 1 and the second sample value is a logic 0, this indicates that the data transmission from the security device is marginally recoverable.

If, however, the first sample value is a logic 0 and the second sample value is a logic 0, this indicates that the data transmission is acceptable. If the second sample value is a logic 1, then the control unit assumes the transmitted data bit to be a logic 1, and it makes no indication regarding the acceptability of the data transmission.

Optionally, prior to sampling the data transmission at a first predetermined time during the bit interval, the control unit may take a pre-sample at a third predetermined time prior to the first predetermined time. If the pre-sample value is a logic 1, the first sample value is a logic 0, and the second sample value is a logic 0, this also indicates that the data transmission is acceptable with marginal distortion.

If the data transmission has been indicated to be marginally recoverable, then the control unit may lower the baud rate of transmission between that security device and the control unit by a pre-determined increment in order to alleviate the marginal data transmission problem.

For example, the third predetermined time may be approximately ⅓ through the duration of the bit interval, the first predetermined time is approximately ⅔ through the duration of the bit interval, and the second predetermined time is near the end of the bit interval.

DETAILED DESCRIPTION OF THE INVENTION

Figure 2:
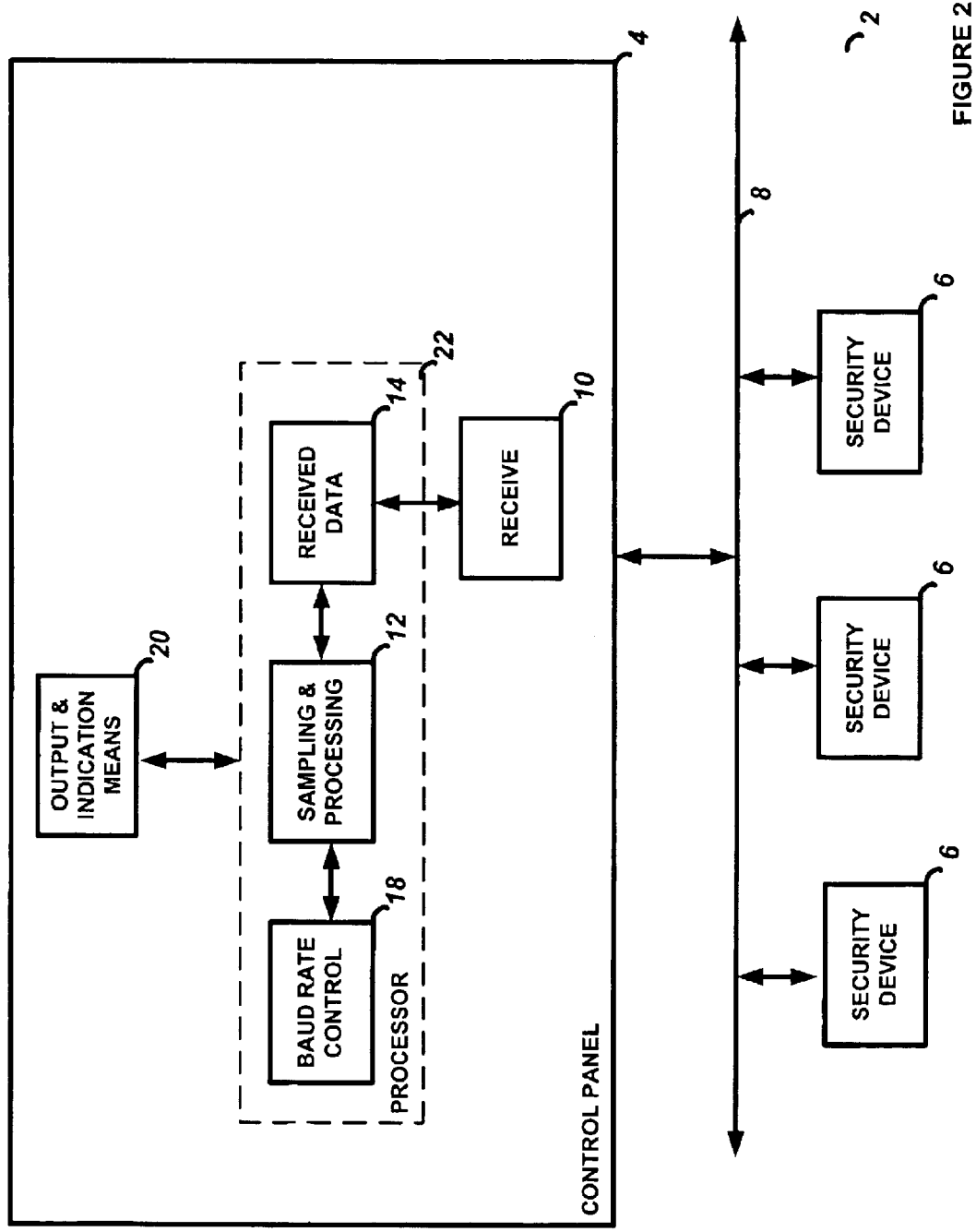
FIG. 2 is a block diagram of the system.

The preferred embodiment of the present invention will now be described. FIG. 2 illustrates a typical layout of a security system 2, which includes a control panel 4, a number of security devices 6, all of which are interconnected for data communications with the control panel 4 by a common data bus or polling loop 8. The control panel 4 communicates with the devices 6 by means of a 37-bit serial data stream, which includes a preamble that defines the type of message being sent, and then various data fields that will vary as a function of the message being sent.

Figure 1A:
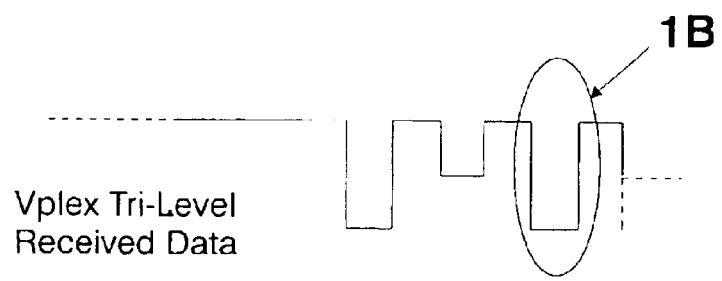
FIG. 1A is a diagram of the tri-level waveform received by the control unit in the present invention.
Figure 1B:
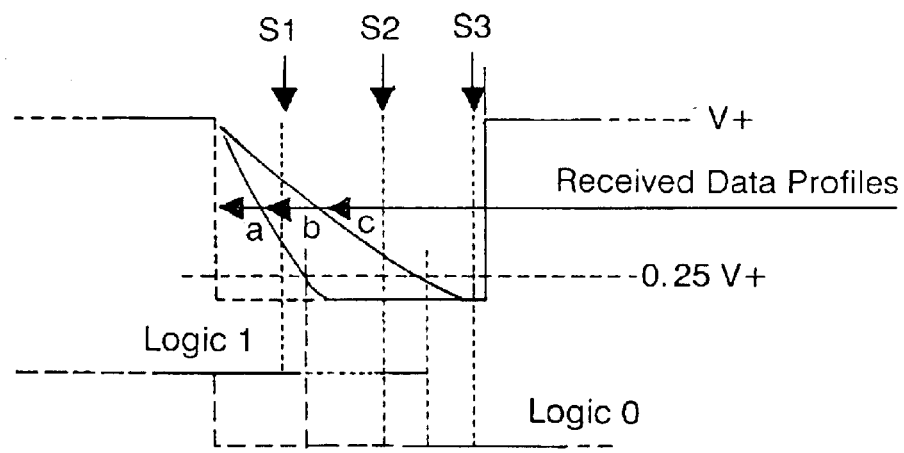
FIG. 1B is a diagram illustrating the sampling times of the present invention.

A portion of a typical waveform received by the control panel 4 from a security device 6 is shown in FIG. 1A. A single logic 0 bit of that waveform is exploded in FIG. 1B. The capacitive loading of the polling loop 8, caused by both the length of the loop and the quantity of devices distributed on that loop, is illustrated in FIG. 1B. The resulting levels of distorted logic 0 profiles are exemplified in the Figure. as (a)=none, (b)=medium, and (c)=severe.

It is noted that the general manner in which the security devices communicate with the control unit, utilizing this type of tri-level waveform, is well known in the art. Specifically, the tri-level waveform is generated under logical control of a driver circuit by the control unit. The baud rate and data sample intervals are derived from a series of internal microprocessor counters activated from an external clock circuit required by the microprocessor.

In addition, during that portion of the waveform in which the security device is responding with data to the control unit, the upper and middle voltage levels are established by the control unit. The source resistance of the driver circuits during generation of the upper level is low in order to power all of the security devices on the polling loop. During generation of the middle voltage level, which is the data bit interval, the source current of the driver circuits is limited to permit the security device to establish a Logic 0 bit by shorting the loop, or by establishing a Logic 1 bit by not shorting the loop, during this interval. Consequently, the best point for the control unit to sample the received data bit is immediately before the control unit terminates the middle level interval and transitions to the upper voltage level. Therefore, the best manner of sampling a bit interval to determine if that bit is being sent as a logic 1 or a logic zero, as well as the general timing of the bit intervals, is known for this type of waveform. The present invention is concerned with taking additional bit samples at certain times to make a determination as to the quality of the signal and to take corrective action if warranted by the samples.

To determine the quality, or margin, of the received logic 0 waveform, one method used here is one in which the control unit samples the given data bit interval three times denoted as S1, S2, and S3 in FIG. 1B where: S1 is applied approximately ⅓ into the logic bit interval; S2 is applied ⅔ into the bit interval; and S3 is the normal final sample just prior to the termination of the bit interval which is determined by the control unit in this system as has been explained. If we define "1" as a logic 1 was sampled and "0" as a logic 0 was sampled then, in the case of little or no distortion, S1, S2, S3=0,0,0. In the case of medium distortion, S1, S2, S3=1,0,0. Finally. In the case of severe distortion, S1, S2, S3=1,1,0. By definition, S1, S2, S3=1,1,1 would define a true logic 1 bit or a badly distorted logic 0 worse than that of profile (c) in FIG. 1B.

In actual practice only S2 and S3 samples would be necessary, and the S1 sample is a pre-sample if used. An acceptable received logic 0 would then correspond to S2, S3=0,0. The sample result of S2, S3=1,0 means that the data is marginally recoverable. The control may be programmed to annunciate this fact to the installer so that the associated transponder can be made known to the installer for possible corrective action to take place. Since the baseband can operate at 1000 Baud±700 baud, the control unit can also be programmed not only to identify the transponders(s) with marginal data recovery at the nominal 1000 Baud, but it can be made to lower the baud rate from the nominal 1000 Baud, to only the associated transponder(s), an amount required to yield the desired recovery margin defined by S2, S3=0,0. If the baud rate has to be lowered below the limit of 300 Baud, the installer must then take other corrective action for the transponder(s) involved.

Data recovery in accordance with this invention is based on the fact that if a logic 0 level is not detected, a logic 1 is assumed. As seen in FIG. 1B, logic 0 is defined as the signal level falling below 25% of the loop voltage, V+. Of course, this value can be defined by the system designer to be anything that may be required.

It can thus be seen how this unique application of multiple data sampling to an existing data recovery system provides diagnostic tools that automatically detects and corrects marginal data recovery from any one or more transponders on a polling loop.

What is claimed is:

1. In a security system comprising a plurality of security devices in communication with a control unit over a serial data communications loop, a method for detecting marginal data transmissions from any of the security devices, comprising the steps of:
   a) the control unit receiving a data transmission from a security device, the data transmission comprising a plurality of bit intervals in which a logic 1 level is assumed by the control unless a logic 0 level is received from the security device;
   b) sampling the data transmission at a first predetermined time during the bit interval to obtain a first sample value;
   c) sampling the data transmission at a second predetermined time during the bit interval to obtain a second sample value, the second predetermined time being later than the first predetermined time;
   d) if the first sample value is a logic 1 and the second sample value is a logic 0, then indicating that the data transmission from the security device is marginally recoverable;
   prior to sampling the data transmission at a first predetermined time during the bit interval, taking a pre-sample at a third predetermined time prior to the first predetermined time, and
   if the pre-sample value a logic 1, the first sample value is a logic 0, and the second sample value is a logic 0, then indicating that the data transmission is acceptable with marginal distortion.

2. The method of claim 1 comprising the further steps of:
   e) if the first sample value is a logic 0 and the second sample value is a logic 0, then indicating that the data transmission is acceptable.

3. The method of claim 1 comprising the further steps of:
   e) if the second sample value is a logic 1 then, assuming logic 1 as the transmitted data bit, making no indication regarding the acceptability of the data transmission.

4. The method of claim 1 further comprising the steps of, if the data transmission has been indicated to be marginally recoverable, then lowering a baud rate of transmission between that security device and the control unit by a pre-determined increment.

5. The method of claim 1 further comprising the steps of, if the data transmission has been indicated to be marginally recoverable, then providing an output indication.

6. The method of claim 1 wherein the third predetermined time is approximately ⅓ through the duration of the bit interval, the first predetermined time is approximately ⅔ through the duration of the bit interval, and the second predetermined time is near the end of the bit interval.

7. A security system comprising:
   a) a plurality of security devices;
   b) a control unit interconnected on a serial data communications loop to each of the security devices; the control unit comprising i) means for receiving a data transmission from a security device, the data transmission comprising a plurality of bit intervals in which a logic 1 level is assumed by the control unless a logic 0 level is received from the security device;

ii) sampling means for sampling the data transmission received from a security device, wherein the sampling means samples at a first predetermined time during the bit interval to obtain a first sample value and at a second predetermined time during the bit interval to obtain a second sample value, the second predetermined time being later than the first predetermined time;

iii) indication means for indicating that the data transmission from the security device is marginally recoverable if the first sample value is a logic 1 and the second sample value is a logic 0;

wherein the sampling means is further adapted to take a pre-sample at a third predetermined time prior to the first predetermined time during the bit interval, and the indication means is further adapted to indicate that the data transmission is acceptable with marginal distortion if the pre-sample value is a logic 1, the first sample value is a logic 0, and the second sample value is a logic 0.

8. The system of claim 7 wherein the indication means is adapted to indicate that the data transmission is acceptable if the first sample value is a logic 0 and the second sample value is a logic 0.

9. The system of claim 7 wherein the indication means is adapted to make no indication regarding the acceptability of the data transmission if the second sample value is a logic 1.

10. The system of claim 7 further comprising means for lowering a baud rate of transmission between that security device and the control unit by a pre-determined increment if the data transmission has been indicated to be marginally recoverable.

11. The system of claim 7 further comprising output means for providing an output indication if the data transmission has been indicated to be marginally recoverable.

12. The system of claim 7 wherein the third predetermined time is approximately $\frac{1}{3}$ through the duration of the bit interval, the first predetermined time is approximately $\frac{2}{3}$ through the duration of the bit interval, and the second predetermined time is near the end of the bit interval.

* * * * *